US012770264B2

(12) United States Patent
Gottumukkal et al.

(10) Patent No.: US 12,770,264 B2
(45) Date of Patent: Oct. 20, 2026

(54) METHOD AND SYSTEM FOR EFFICIENT OBJECT DENSITY ESTIMATION USING DYNAMIC INPUT RESOLUTION

(71) Applicant: Tyco Fire & Security GmbH, Neuhausen am Rheinfall (CH)

(72) Inventors: Rajkiran Kumar Gottumukkal, Bangalore (IN); Deepak Chembakassery Rajendran, Thrissur (IN)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 309 days.

(21) Appl. No.: 18/403,333

(22) Filed: Jan. 3, 2024

(65) Prior Publication Data

US 2024/0233130 A1 Jul. 11, 2024

Related U.S. Application Data

(60) Provisional application No. 63/479,422, filed on Jan. 11, 2023.

(51) Int. Cl.
*G06T 7/11* (2017.01)
*G06T 7/136* (2017.01)

(52) U.S. Cl.
CPC ................ *G06T 7/11* (2017.01); *G06T 7/136* (2017.01); *G06T 2207/20132* (2013.01); *G06T 2207/30242* (2013.01)

(58) Field of Classification Search
CPC . G06T 2207/30242; G06T 7/11; G06T 7/136; G06T 2207/20132; G06V 20/00
See application file for complete search history.

(56) References Cited

U.S. PATENT DOCUMENTS 11,461,992 B2 * 10/2022 Vitek ..................... G06V 10/25
2019/0333241 A1 * 10/2019 Yano ........................ G08G 1/04
(Continued)

FOREIGN PATENT DOCUMENTS

CN 107944327 A 4/2018
CN 115131291 A * 9/2022 ........... G06T 7/0002

OTHER PUBLICATIONS

S. Deng et al., "A Global-Local Self-Adaptive Network for Drone-View Object Detection," in IEEE Transactions on Image Processing, vol. 30, pp. 1556-1569, 2021, doi: 10.1109/TIP.2020.3045636. (Year: 2021).*

(Continued)

*Primary Examiner* — Vu Le
*Assistant Examiner* — Jack Peter Kraynak
(74) *Attorney, Agent, or Firm* — ArentFox Schiff LLP

(57) ABSTRACT

A method, apparatus, and computer-readable medium for counting objects in an image, including receiving a first image having a first size greater than a size threshold; formatting the first image into a second image having a second size less than the first size; estimating, using a first object counting model, an initial object count in the second image; generating a third image using a first region of the first image in response to the initial object count being greater than an object count threshold, the first region corresponding to a first portion of the initial object count greater than a second portion of the initial object count corresponding to a second region of the first image; compiling an updated object count for the first image based on the updated first portion of the initial object count in the third image; and transmitting a notification based on the updated object count.

18 Claims, 10 Drawing Sheets

(56) References Cited

U.S. PATENT DOCUMENTS

| | | | | |
|---|---|---|---|---|
| 2020/0311440 | A1* | 10/2020 | Bamba | G06V 10/50 |
| 2021/0089816 | A1* | 3/2021 | Amon | G06T 7/194 |
| 2022/0286599 | A1* | 9/2022 | Bi | H04N 23/695 |

OTHER PUBLICATIONS

C. Duan, Z. Wei, C. Zhang, S. Qu and H. Wang, "Coarse-grained Density Map Guided Object Detection in Aerial Images," in 2021 IEEE/CVF International Conference on Computer Vision Workshops (ICCVW), Montreal, BC, Canada, 2021, pp. 2789-2798, doi: 10.1109/ICCVW54120.2021.00313. (Year: 2021).*

Z. Ma, Lei Yu and A. B. Chan, "Small instance detection by integer programming on object density maps," 2015 IEEE Conference on Computer Vision and Pattern Recognition (CVPR), Boston, MA, 2015, pp. 3689-3697, doi: 10.1109/CVPR.2015.7298992. (Year: 2015).*

C. Li, T. Yang, S. Zhu, C. Chen and S. Guan, "Density Map Guided Object Detection in Aerial Images," in 2020 IEEE/CVF Conference on Computer Vision and Pattern Recognition Workshops (CVPRW), Seattle, WA, USA, 2020, pp. 737-746, doi: 10.1109/CVPRW50498.2020.00103. (Year: 2020).*

X. Zhang, Y. Feng, S. Zhang, N. Wang and S. Mei, "Finding Nonrigid Tiny Person With Densely Cropped and Local Attention Object Detector Networks in Low-Altitude Aerial Images," in IEEE Journal of Selected Topics in Applied Earth Observations and Remote Sensing, vol. 15, pp. 4371-4385, 2022 (Year: 2022).*

L. Liu, Z. Cao, H. Lu, H. Xiong and C. Shen, "NSSNet: Scale-Aware Object Counting With Non-Scale Suppression," in IEEE Transactions on Intelligent Transportation Systems, vol. 23, No. 4, pp. 3103-3114, Apr. 2022, doi: 10.1109/TITS.2020.3030781. (Year: 2022).*

International Search Report and Written Opinion issued in International Patent Application No. PCT/US2024/010919 on Mar. 28, 2024.

Li Changlin et al: "Density Map Guided Object Detection in Aerial Images", 2020 IEEE/CVF Conference on Computer Vision and Pattern Recognition Workshops (CVPRW), IEEE, Jun. 14, 2020 (Jun. 14, 2020), pp. 737-746.

Duan Chengzhen et al: "Coarse-grained Density Map Guided Object Detection in Aerial Images", 2021 IEEE/CVF International Conference on Computer Vision Workshops (ICCVW), IEEE, Oct. 11, 2021 (Oct. 11, 2021), pp. 2789-2798.

Ma Zheng et al: "Small instance detection by integer programming on object density maps", 2015 IEEE Conference on Computer Vision and Pattern Recognition (CVPR), IEEE, Jun. 7, 2015 (Jun. 7, 2015), pp. 3689-3697.

Krishna Harish et al: "Improving Small Object Detection", 2017 4th IAPR Asian Conference on Pattern Recognition (ACPR), IEEE, Nov. 26, 2017 (Nov. 26, 2017), pp. 340-345.

* cited by examiner

METHOD AND SYSTEM FOR EFFICIENT OBJECT DENSITY ESTIMATION USING DYNAMIC INPUT RESOLUTION

CROSS-REFERENCE TO RELATED APPLICATION(S)

The present application claims priority to U.S. Provisional Application No. 63/479,422, entitled "METHOD AND SYSTEM FOR EFFICIENT OBJECT DENSITY ESTIMATION USING DYNAMIC INPUT RESOLUTION" and filed on Jan. 11, 2023, which is assigned to the assignee hereof and incorporated by reference herein in the entirety.

FIELD

The described aspects relate to image processing, and more specifically, to methods and systems for efficient object density estimation using dynamic input resolution.

BACKGROUND

Counting the number of objects in a large group is a difficult problem. Manual methods are exceedingly costly and are generally too slow. Previous attempts to use a processor have suffered from scalability and accuracy problems.

With the increasing use of video surveillance and monitoring in public areas to improve safety and/or security, techniques for analyzing such images/videos are becoming increasingly important. There are various techniques that are utilized or have been proposed for video analysis. The current generation of closed-circuit television (CCTV) systems are primarily visual aids for a control operator who then analyzes the video for unusual patterns of activity and takes specific control actions. However, as the number of deployed cameras increases, monitoring all the video streams simultaneously becomes increasingly difficult, and the likelihood of missing significant events of interest is quite high. Therefore, automated image analysis using computer vision techniques is of interest.

Conventional apparatus and methods require a significant amount of processing power and cannot be performed quickly.

There remains a need in the field to practically and efficiently count the number of objects in an image.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method for counting objects in an image, comprising receiving a first image having a first size greater than a size threshold. The method further includes formatting the first image into a second image having a second size less than the first size. Additionally, the method further includes estimating, using a first object counting model, an initial object count in the second image. Additionally, the method further includes comparing the initial object count with an object count threshold. Additionally, the method further includes generating a third image using a first region of the first image in response to the initial object count being greater than the object count threshold, wherein the first region corresponds to a first portion of the initial object count greater than a second portion of the initial object count corresponding to a second region of the first image. Additionally, the method further includes determining, by a second object counting model, an updated first portion of the initial object count in the third image. Additionally, the method further includes compiling an updated object count for the first image based on the updated first portion of the initial object count in the third image. Additionally, the method further includes transmitting a notification based on the updated object count.

Another example aspect includes an apparatus for counting objects in an image, comprising one or more memories storing instructions, and one or more processors communicatively coupled with the one or more memories. The one or more processors, individually or in combination, are configured to execute the instructions to receive a first image having a first size greater than a size threshold. The one or more processors, individually or in combination, are further configured to execute the instructions to format the first image into a second image having a second size less than the first size. Additionally, the one or more processors, individually or in combination, are further configured to execute the instructions to estimate, using a first object counting model, an initial object count in the second image. Additionally, the one or more processors, individually or in combination, are further configured to execute the instructions to compare the initial object count with an object count threshold. Additionally, the one or more processors, individually or in combination, are further configured to execute the instructions to generate a third image using a first region of the first image in response to the initial object count being greater than the object count threshold, wherein the first region corresponds to a first portion of the initial object count greater than a second portion of the initial object count corresponding to a second region of the first image. Additionally, the one or more processors, individually or in combination, are further configured to execute the instructions to determine, by a second object counting model, an updated first portion of the initial object count in the third image. Additionally, the one or more processors, individually or in combination, are further configured to execute the instructions to compile an updated object count for the first image based on the updated first portion of the initial object count in the third image. Additionally, the one or more processors, individually or in combination, are further configured to execute the instructions to transmit a notification based on the updated object count.

Another example aspect includes an apparatus for counting objects in an image, comprising means for receiving a first image having a first size greater than a size threshold. The apparatus further includes means for formatting the first image into a second image having a second size less than the first size. Additionally, the apparatus further includes means for estimating, using a first object counting model, an initial object count in the second image. Additionally, the apparatus further includes means for comparing the initial object count with an object count threshold. Additionally, the apparatus further includes means for generating a third image using a first region of the first image in response to the initial object count being greater than the object count threshold, wherein the first region corresponds to a first portion of the initial object count greater than a second portion of the initial object count corresponding to a second region of the first image. Additionally, the apparatus further includes means for determining, by a second object counting model, an updated first portion of the initial object count in the third image. Additionally, the apparatus further includes means for compiling an updated object count for the first image based on the updated first portion of the initial object count in the third image. Additionally, the apparatus further includes means for transmitting a notification based on the updated object count.

Another example aspect includes one or more computer-readable media having instructions stored thereon for counting objects in an image, wherein the instructions are executable by one or more processors, individually or in combination, to receive a first image having a first size greater than a size threshold. The instructions are further executable to format the first image into a second image having a second size less than the first size. Additionally, the instructions are further executable to estimate, using a first object counting model, an initial object count in the second image. Additionally, the instructions are further executable to compare the initial object count with an object count threshold. Additionally, the instructions are further executable to generate a third image using a first region of the first image in response to the initial object count being greater than the object count threshold, wherein the first region corresponds to a first portion of the initial object count greater than a second portion of the initial object count corresponding to a second region of the first image. Additionally, the instructions are further executable to determine, by a second object counting model, an updated first portion of the initial object count in the third image. Additionally, the instructions are further executable to compile an updated object count for the first image based on the updated first portion of the initial object count in the third image. Additionally, the instructions are further executable to transmit a notification based on the updated object count.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, wherein dashed lines may indicate optional elements, and in which.

DETAILED DESCRIPTION

Figure 1:
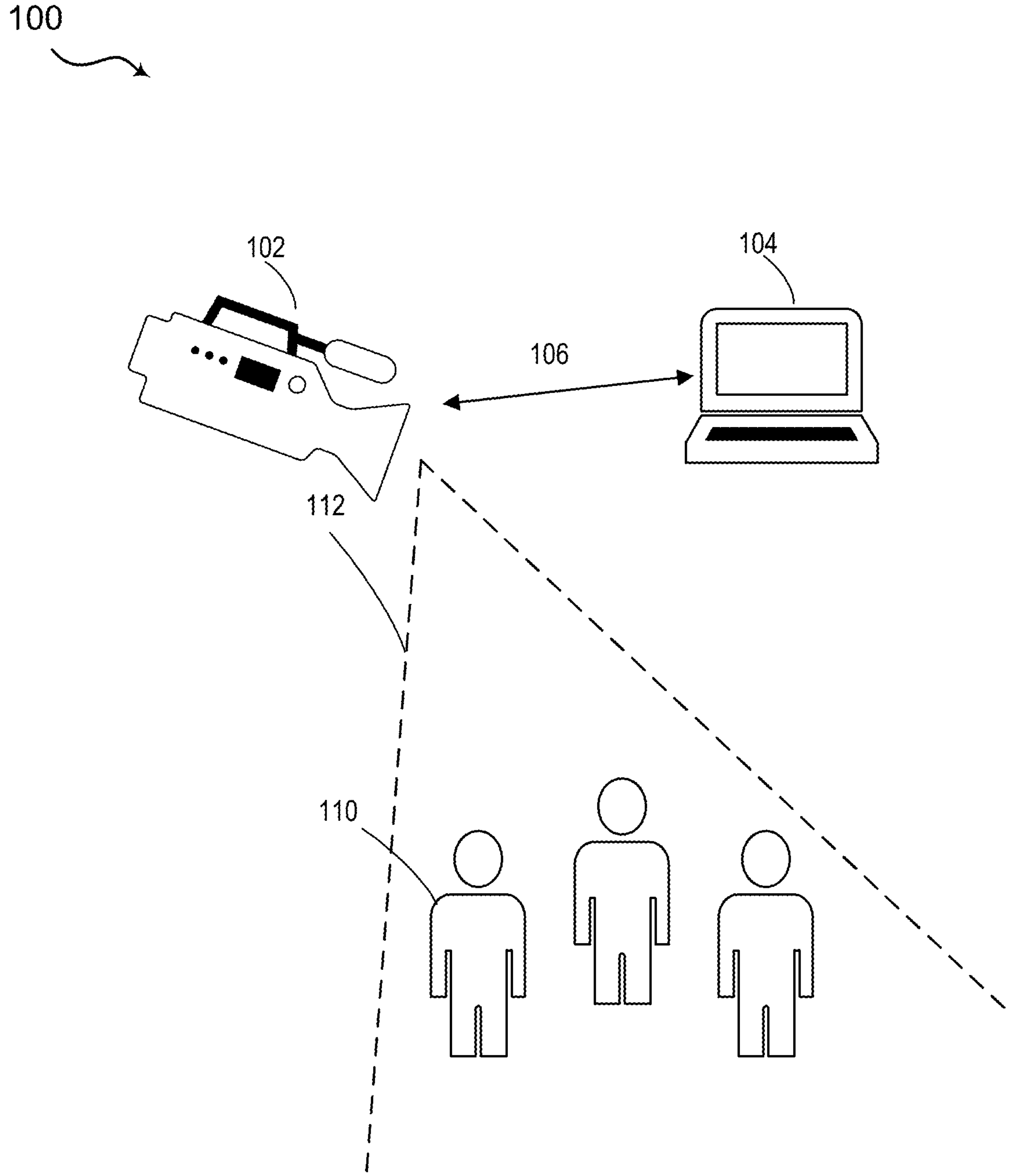
FIG. 1 is a block diagram of an example of a deployed object counting system, in accordance with aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Aspects of the present disclosure are directed to an object counting system. An object counting system comprises in general terms a sensing part and an analyzing part. The sensing part may be commonly based on a sensor detecting some feature related to the objects, for example, an image sensor detecting the visible part of the light spectrum for detecting visible features of objects.

In the case of the sensing part being a sensor registering features of the objects in an array, e.g., registering data that may be interpreted and analyzed by image analyzing tools, the analyzing part may generally be adapted for image analyzing. In some object counting systems, the image analysis is based on object detection algorithms, e.g., in which individual objects are detected, identified, and tracked throughout the area covered by the sensor and then counted as they pass by a predetermined boundary.

One problem with the current object detection algorithms is that objects being close together, having similar features, and/or having approximately the same speed are very difficult to detect as separate objects. Situations where these problems are evident are, for instance, when counting objects that are haphazardly outputted onto a conveyer belt as the objects may arrange themselves close together or on top of each other in clusters of varying sizes, when counting people entering or exiting shops or grocery stores, as people often enter in clusters, i.e., people entering in groups of two or more walking closely together, and other similar situations. A cluster of objects may be understood as a group of objects grouped close together. The problem occurs because the cluster of objects may be detected as one single object, or cannot be detected at all. Many object counting systems rely on simply counting the detected objects which may result in an underestimation of the number of objects if the objects arrive in clusters and if each cluster is counted as one object or is uncounted.

In some conventional object counting solutions, the shape of a detected object is analyzed in order to estimate a more accurate count of the number of objects in the analyzed image. However, such shape analysis of the detected objects in high-resolution images requires substantially more processing power as compared to low-resolution images, which may limit their use to devices having a lot of spare processing power. Such processing power may not be available in embedded systems or devices having a small form factor.

Aspects of the present disclosure are directed to a method for more efficient processing of high-resolution images for object counting purposes. In an aspect, the disclosed method resizes selective original high-resolution images to process the image in a more efficient manner as described below. Aspects of the disclosure use object detection and density estimation to form an adaptive solution for quickly and efficiently counting objects in an image. Prior solutions use full high-resolution images to get an accurate count of object density. The described aspects include an adaptive solution which uses high-resolution images only when it helps. For instance, the described aspects use a classifier to determine regions of an image which are crowded. Further, the described aspects use lower resolution images in regions where object density is low to get a count of the number of objects, and use higher resolution images in regions with high object density to get an accurate count. Consequently, the present aspects may reduce the overall computational time without reducing accuracy due to the proposed adaptive resolution processing.

FIG. 1 is an example of a deployed object counting system, in accordance with aspects of the present disclosure. The deployed object counting system comprises a video analytic system 100, which includes a local sensing device 102, a server 104, and a communication link 106. In an aspect, local sensing device 102 is mounted to look down at a particular area (e.g., to capture a top view). In other aspects, however, local sensing device 102 may be positioned to provide image data at different orientations.

Local sensing device 102 may be configured to capture a plurality of different types of data, including image and/or video data, audio data, depth stream data, and/or combinations thereof. That is, local sensing device 102 may include a camera (e.g., a security camera) with functionality of monitoring the surroundings, a depth stream sensor, and/or a microphone for capturing audio data. In addition, other types of sensors may be utilized depending on the application.

The local sensing device 102 may be configured to communicate with server 104 via communication link 106. Depending on the application requirements, communication may be wired or wireless. In one aspect, local sensing device 102 may provide raw (unprocessed) sensor data to server 104 for processing by a video analytic system. In other aspects, local sensing device 102 may include a local processor for providing local processing of the raw sensor data. A benefit of the latter approach is that the bandwidth associated with communication link 106 may be less than that required for transfer of raw sensor data. In particular, rather than communicating raw sensor data, local sensing device 102 may only be required to communicate the results of the locally performed analysis (e.g., number of people and/or objects, events detected, etc.). In addition to requiring less bandwidth, privacy may be improved by preventing communication of raw data across communication link 106 and thereby preventing possible theft of the data en route to server 104.

Based on the collected sensor data, video analytics—whether executed locally or remotely—processes the data to identify and count objects, such as, but not limited to, individuals 110 within a field of view 112 of local sensing device 102. In addition, the video analytic system 100 may generate a plurality of metrics or values associated with the processed sensor data, such as the count of objects or people in a particular location, the average number of objects, the average size of objects, and the like. FIGS. 3A-3E and 4-7 described below illustrate various steps/functions performed by the video analytic system 100 to generate the desired metrics, in accordance with aspects of the present disclosure.

Figure 2:
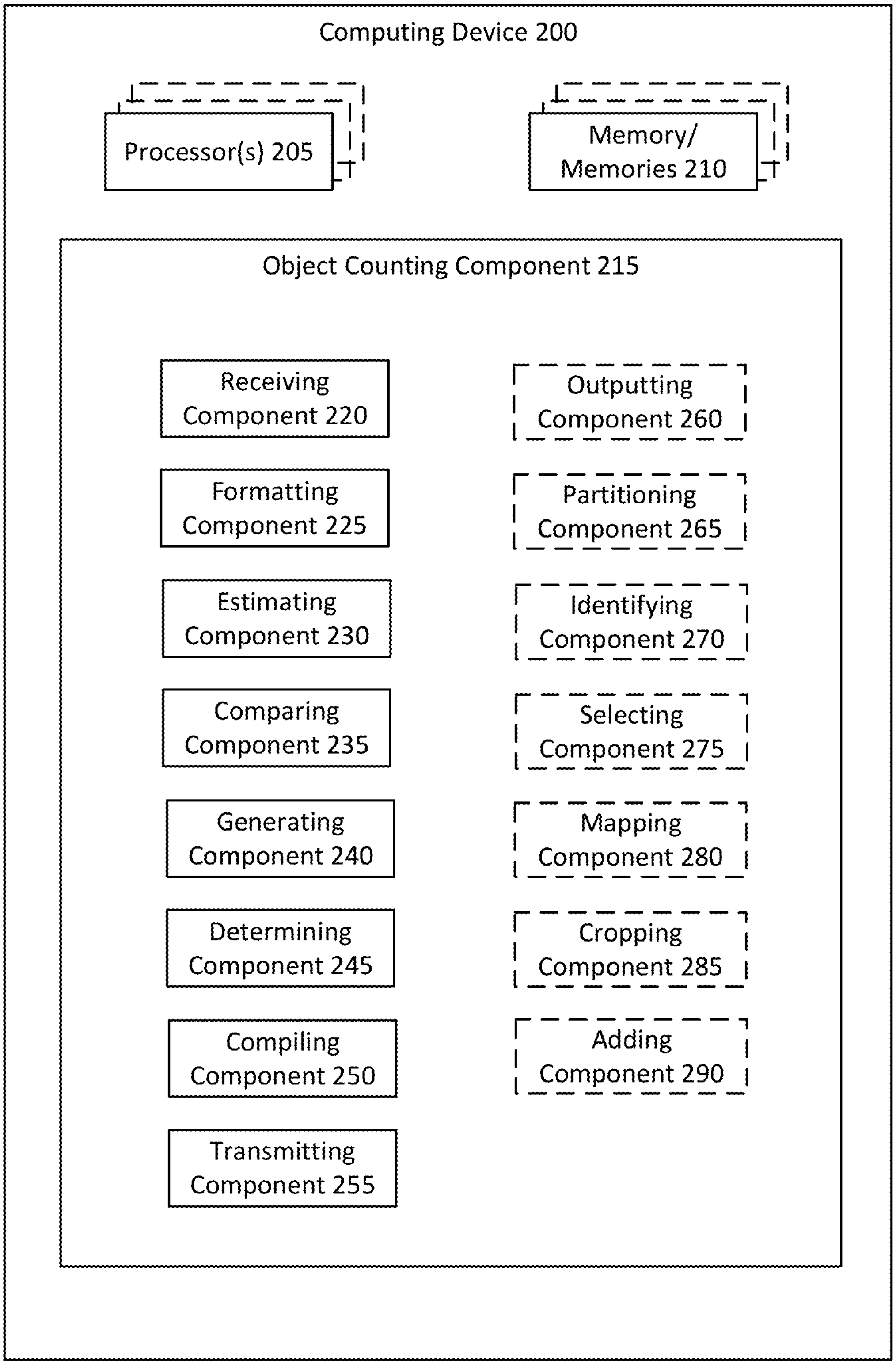
FIG. 2 is a block diagram of an example of a computing device having components configured to perform a method for counting objects in an image, in accordance with aspects of the present disclosure.

FIG. 2 is a block diagram of an example of a computing device 200 having components configured to perform a method for counting objects in an image, in accordance with aspects of the present disclosure. For example, computing device 200 may implement all or a portion of video analytic system 100, local sensing device 102, and/or server 104 described above for counting objects in an image, in accordance with aspects of the present disclosure. In one aspect, for example, computing device 200 may represent any of the local sensing device 102 or the server 104 shown in FIG. 1, and may include one or more processors 205 (e.g., one or more central processing units (CPUs)), one or more memories 210, and one or more components 220, 225, 230, 235, 240, 245, 250, 255, 260, 265, 270 and 275 configured to perform a method for counting objects in an image.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may in combination, execute the respective subset of instructions to accomplish performing actions X, Y, and Z. Alternatively, three processors may access one of three different memories each storing one of instructions for performing X, Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

When acting under the control of appropriate software or firmware, the one or more processors 205, individually or in combination, may be responsible for implementing specific functions. In at least one aspect, the one or more processors 205, individually or in combination, may be caused to perform one or more of the different operations under the control of software modules/components 220, 225, 230, 235, 240, 245, 250, 255, 260, 265, 270 and 275, which for example, may include one or more operating systems and any appropriate applications software, drivers, and the like.

In some aspects, the one or more processors 205 may include specially-designed hardware (e.g., application-specific integrated circuits (ASICs), electrically erasable programmable read-only memories (EEPROMs), field-programmable gate arrays (FPGAs), and the like) for controlling the operations of computing device 200. In a specific aspect, the one or more memories 210 (such as non-volatile random access memory (RAM) and/or read-only memory (ROM)) also form part of the one or more processors 205. However, there are many different ways in which memory may be coupled to the system. The one or more memories 210 may be used for a variety of purposes such as, for example, caching and/or storing data, programming instructions, and the like.

As used herein, the term "processor" is not limited merely to those integrated circuits referred to in the art as a processor, but broadly refers to a microcontroller, a microcomputer, a programmable logic controller, an application-specific integrated circuit, and any other programmable circuit.

In an aspect, the object counting component 215 in the computing device 200 may include the following components: receiving component 220, formatting component 225, estimating component 230, comparing component 235, generating component 240, determining component 245, compiling component 250, transmitting component 255, outputting component 260, partitioning component 265, identifying component 270, and the selecting component 275. Functionality of these components is described below in conjunction with FIGS. 3A-3E and 4-7.

Although the system shown in FIG. 2 illustrates one specific architecture for a computing device 200 for implementing the techniques of the invention described herein, it is by no means the only device architecture on which at least a portion of the features and techniques described herein may be implemented. For example, architectures having one or any number of processors can be used, and such processors can be present in a single device or distributed among any number of devices.

Regardless of computing device configuration, the system of the present disclosure may employ one or more memories or memory modules (such as, for example, the one or more memories 210) configured to store data, program instructions for the general-purpose network operations, and/or other information relating to the functionality of object counting described herein. The program instructions may control the operation of an operating system and/or one or more applications, for example. The memory or memories may also be configured to store data structures, device identifier information, timestamp information, and/or other specific non-program information described herein.

Because such information and program instructions may be employed to implement the systems/methods described herein, at least some computing device aspects may include non-transitory computer-readable or machine-readable storage media, which, for example, may be configured or designed to store program instructions, state information, and the like for performing various operations described herein. Examples of such non-transitory computer-readable storage media include, but are not limited to, magnetic media such as hard disks, floppy disks, and magnetic tape; optical media such as CD-ROM disks; magneto-optical media such as floptical disks, and hardware devices that are specially configured to store and perform program instructions, such as RAM, ROM, flash memory, memristor memory, and the like. Examples of program instructions include both machine code, such as produced by a compiler, and files containing higher level code that may be executed by the computer using an interpreter.

Figure 3A:
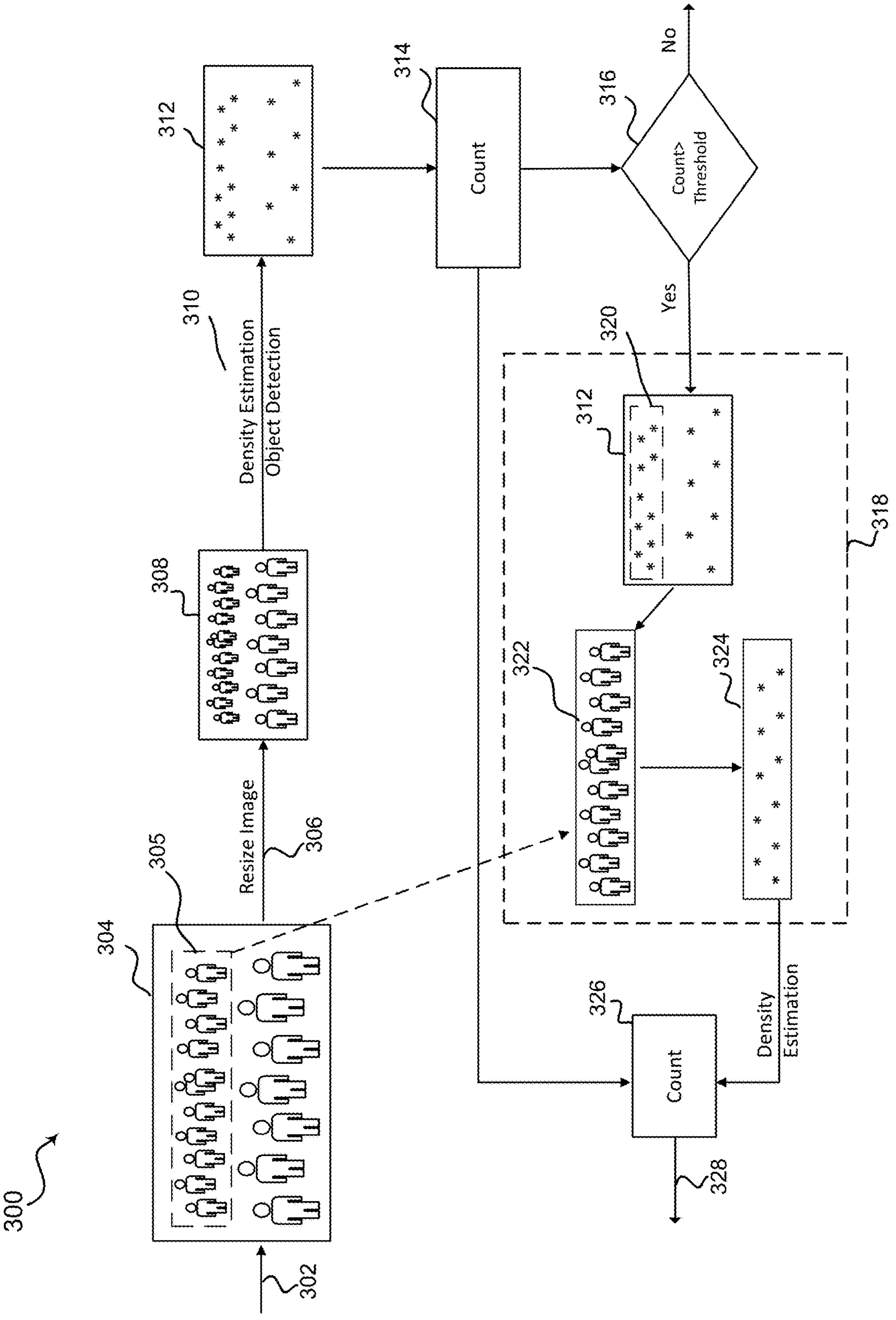
FIG. 3A is an example block diagram that illustrates how components of the object counting system process a high-density image, in accordance with aspects of the present disclosure.

FIG. 3A is an example block diagram 300 that illustrates how components of the object counting system process a high-density image, in accordance with aspects of the present disclosure. For example, the object counting in FIG. 3A may be performed by computing device 200 (FIG. 2) executing an example method 400 (FIG. 4) as described below.

In operation, computing device 200 may perform a method of counting objects in a high-density image, such as via execution of object counting component 215 by one or more processors 205 and/or one or more memories 210, individually or in combination.

Figure 3B:
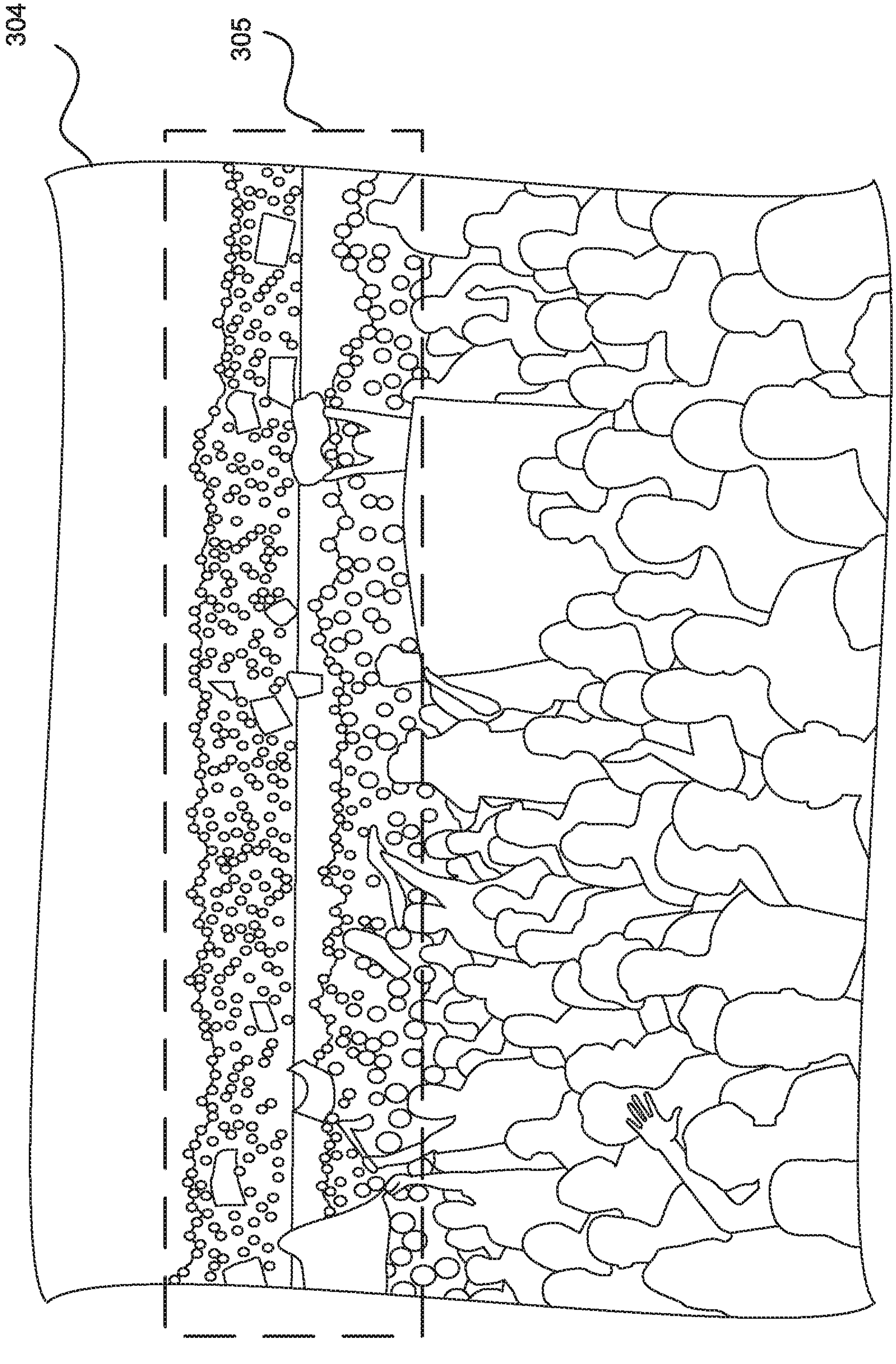
FIG. 3B is an example of the high-density image of FIG. 3A, in accordance with aspects of the present disclosure.
Figure 3C:
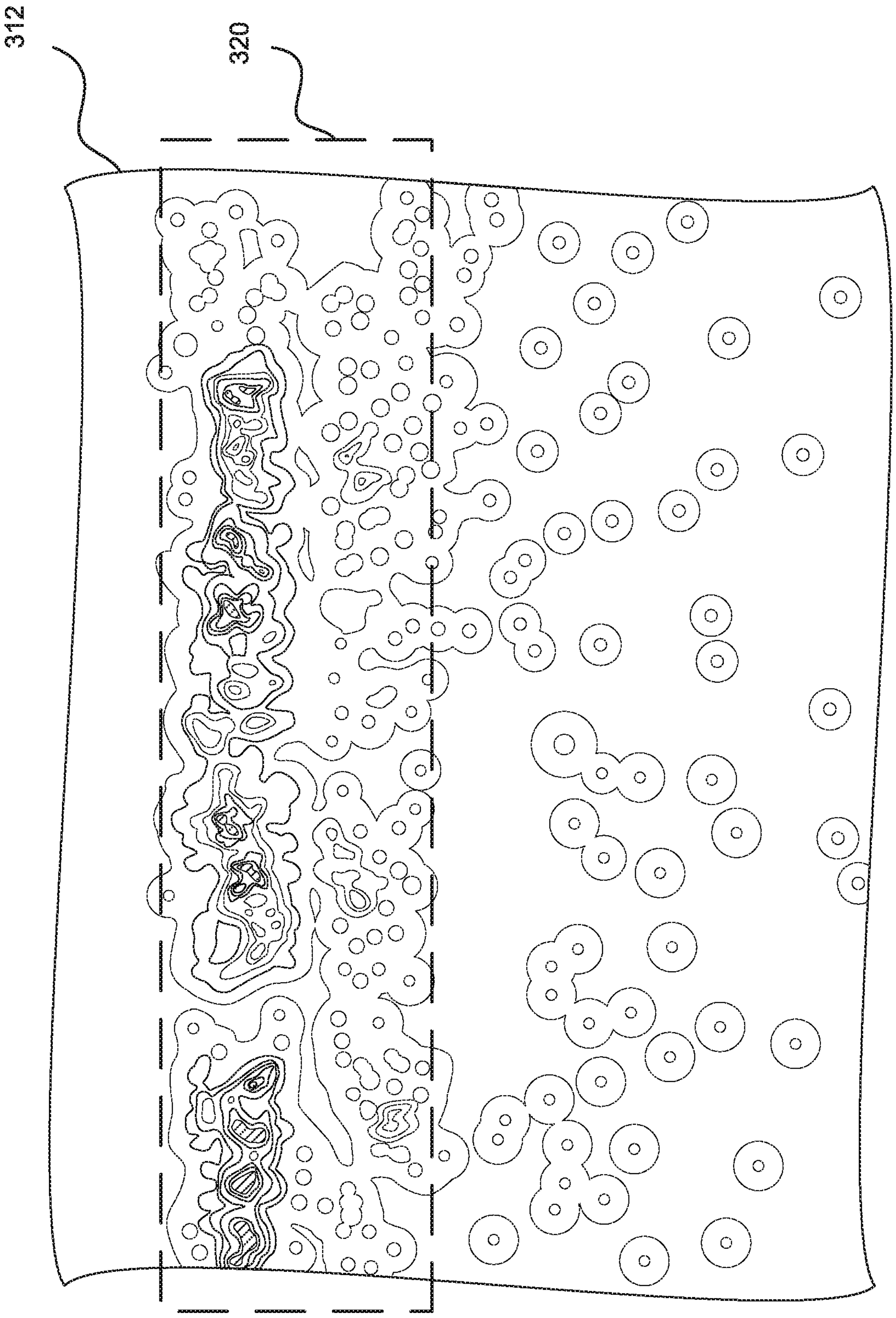
FIG. 3C is an example density map of the high-density image of FIG. 3A, in accordance with aspects of the present disclosure.

At 302, the receiving component 220 may be configured to receive a first image 304 (FIGS. 3A and 3B). In an aspect, the first image 304 may be a high-resolution image such as a photograph of attendees of an event (FIG. 3B). The high-resolution image may be acquired, for example, at a full sensor resolution, such as but not limited to 5 megapixels.

At 306, the formatting component 225 may perform an image resizing process, so as to resize the high-resolution first image 304 into a low-resolution second image 308. In an aspect, for example, the second image 308 may have one half of the resolution of the first image 304. For example, if the first image 304 is a 1280×960 pixel matrix, then the second image 308 may be a 640×480 pixel matrix. Typically, the accuracy of the object counting model is dependent on the resolution of the analyzed image.

At 310, the estimating component 230 may perform the task of density estimation for the second image 308. In an aspect, the estimating component 230 may provide outputs, such as a first density map 312 (FIGS. 3A and 3C) that may be used to determine a first count of detected objects 314. In one implementation, for example, during an image-level supervised or unsupervised training procedure, a loss function, which includes parameters for predicting the total count and spatial distribution of objects, enables an object counting model to learn how to construct density maps for each category of objects. Once trained, the object counting model may construct density maps from images that can be used to perform object counting, image segmentation, and/or other computer vision functions.

In an aspect, the first count of detected objects 314 may be generated using a combination of an object detection model and an object density estimation model. In an aspect, the object detection model may be a method such as a You Only Look Once (YOLO) neural network that may be configured to detect heads. Other examples of object types include, but are not limited to, animate objects such as animals and humans, and inanimate objects such as vehicles and furniture. One skilled in the art will appreciate that virtually any object type may be detected by the object detector; an objective of the present disclosure is to improve accuracy of detection of that object type and its features without overly exhausting processing resources and causing high latencies.

In one aspect of the present disclosure, image features for density estimation may be extracted using a baseline deep neural network, such as, but not limited to, a Visual Geometry Group (VGG) convolutional neural network (VGG net). Compared with traditional artificial features, neural network features are more complex and more suitable for representing the content of images. Therefore, the effectiveness of prediction is greatly improved while using the neural network features.

At block 316, the comparing component 235 may compare the first count of detected objects 314 with a predetermined object count threshold. For example, but not limited hereto, the predetermined object threshold may be equal to 30 objects. Such predetermined threshold may be user configurable to distinguish between what the user considers to be a high-density region and a low-density region in the image.

If the first count of detected objects 314 is less than the predetermined object count threshold (block 316, "No" branch), then the transmitting component 255 may simply transmit and/or output the first count of detected objects 314. If the first count of detected objects 314 is greater than the predetermined object count threshold (block 316, "Yes" branch), then at block 318 the generating component 240 may analyze the first density map 312 to identify clusters of objects. In an aspect, the count of objects in each cluster may exceed the predetermined object cluster threshold. Having identified clusters of objects, the generating component 240 may partition or segment the density map 312 into portions in which the clusters reside such that each partitioned portion of the first density map 312 represents a region of interest 320 (FIGS. 3A and 3C) corresponding to a cluster of objects.

Furthermore, at lock 318, the generating component 240 may process the first image 304 to generate (e.g., crop, pad, resize, etc.,) a third image 322 (FIGS. 3A and 3D) of one of the regions 305 depicted in the first image 304, such that the generated third image 322 corresponds to the identified region of interest 320 in the first density map 312 and may be directly cropped from the first image 304 without resizing. In addition, the determining component 245 may perform the task of density estimation for the third image 322. In an aspect, the determining component 245 may provide outputs, such as a second density map 324 (FIGS. 3A and 3E) along with the first density map 312 that may be used to determine a second count of detected objects 326 using an object count estimation model. Advantageously, performing density estimation using the third image 322 that has higher resolution produces more accurate results for the region of interest 320 than using the second image 308 having lower resolution. It should be noted that performing density estimation for the entire first image 304 would require significantly more processing power. In other words, the method illustrated in FIG. 3A performs selective or adaptive density estimation for a high-resolution image based on detected high-density clusters of objects.

At 328, the compiling component 250 may combine the first count of detected objects 314 and the second count of detected objects 326 to generate a total count of the detected objects.

Figure 4:
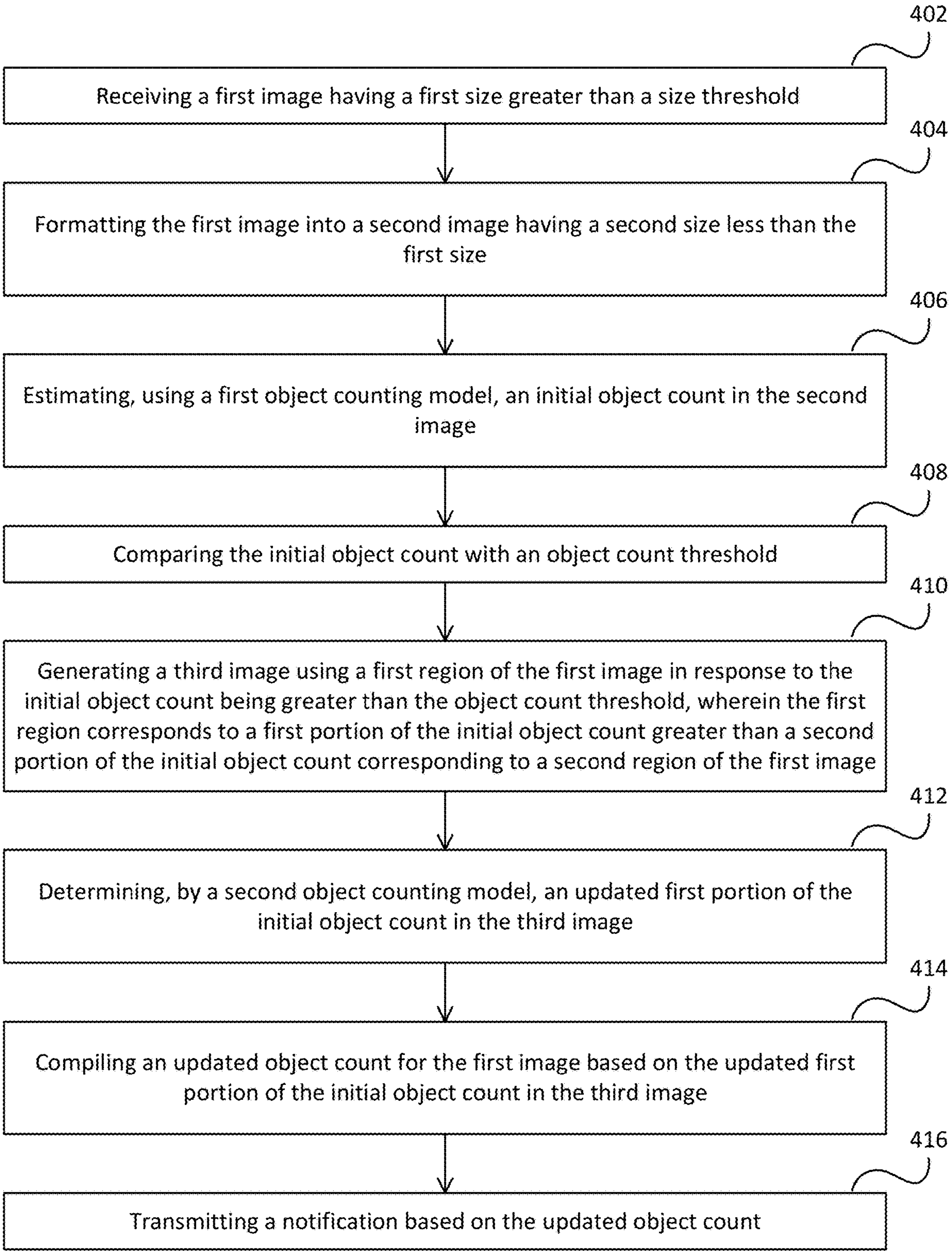
FIG. 4 is a flowchart of an example of a method for counting objects in an image, in accordance with aspects of the present disclosure.

FIG. 4 is a flowchart of an example of a method 400 for counting objects in an image, in accordance with aspects of the present disclosure. In various aspects, the method 400 may be performed by computing device 200 implementing all or a portion of video analytic system 100, local sensing device 102, server 104, and/or any device or component described herein for counting objects in an image, in accordance with aspects of the present disclosure. In some aspects, for example, computing device 200 may perform the method 400 of counting objects in a high-density image, such as via execution of object counting component 215 by one or more processors 205 and/or one or more memories 210, individually or in combination.

At block 402, the method 400 includes receiving a first image having a first size greater than a size threshold. For example, in an aspect, computing device 200, one or more processor 205 individually or in combination, one or more memories 210 individually or in combination, object counting component 215, and/or receiving component 220 may be configured to or may comprise means for receiving a first image having a first size greater than a size threshold. For example, the first image 304 (FIGS. 3A and 3B) received at block 402 may be a 1280×960 pixel matrix.

At block 404, the method 400 includes formatting the first image into a second image having a second size less than the first size. For example, in an aspect, computing device 200, one or more processor 205 individually or in combination, one or more memories 210 individually or in combination, object counting component 215, and/or formatting component 225 may be configured to or may comprise means for formatting the first image into a second image having a second size less than the first size.

For example, the formatting at block 404 may include performing image resizing process, so as to resize the high-resolution first image 304 into a low-resolution second image 308.

At block 406, the method 400 includes estimating, using a first object counting model, an initial object count in the second image. For example, in an aspect, computing device 200, one or more processor 205 individually or in combination, one or more memories 210 individually or in combination, object counting component 215, and/or estimating component 230 may be configured to or may comprise means for estimating, using a first object counting model, an initial object count in the second image.

For example, the estimating at block 406 may be generated using an ensemble of a YOLO-based object counting model and an object count estimation model.

Further, for example, image features may be extracted using a baseline deep neural network, such as, but not limited to a VGG net. Compared with traditional artificial features, neural network features are more complex and more suitable for representing the content of images.

At block 408, the method 400 includes comparing the initial object count with an object count threshold. For example, in an aspect, computing device 200, one or more processor 205 individually or in combination, one or more memories 210 individually or in combination, object counting component 215, and/or comparing component 235 may be configured to or may comprise means for comparing the initial object count with an object count threshold.

For example, the object count threshold may be equal to 30 objects. Such object count threshold may be user configurable.

At block 410, the method 400 includes generating a third image using a first region of the first image in response to the initial object count being greater than the object count threshold, wherein the first region has a first portion of the initial object count greater than a second portion of the initial object count corresponding to a second region of the first image. For example, in an aspect, computing device 200, one or more processor 205 individually or in combination, one or more memories 210 individually or in combination, object counting component 215, and/or generating component 240 may be configured to or may comprise means for generating a third image using a first region of the first image in response to the initial object count being greater than the object count threshold, wherein the first region has a first portion of the initial object count greater than a second portion of the initial object count corresponding to a second region of the first image.

Figure 3D:
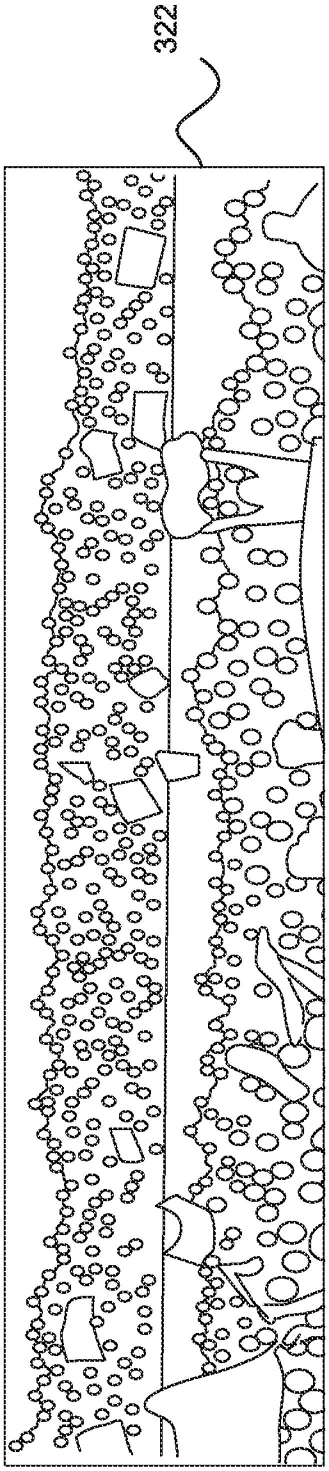
FIG. 3D is an example of a dense portion of the high-density image of FIG. 3A, in accordance with aspects of the present disclosure.
Figure 3E:
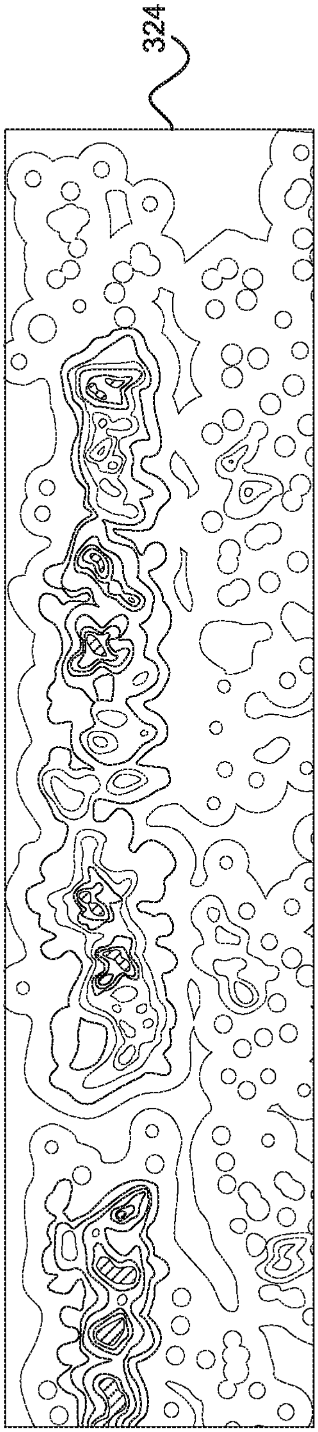
FIG. 3E is an example of a density map of the dense portion of the high-density image of FIG. 3A, in accordance with aspects of the present disclosure.

For example, when the count of the detected objects in the second image 308 exceeds the object count threshold, the region of interest 320 in the first density map 312 (FIGS. 3A and 3C) is identified as including a cluster of objects and therefore having a higher object count as compared to other regions of the first density map 312. Then, the corresponding region 305 of the first image 304 (FIGS. 3A and 3B) is used to generate the third image 322 (FIGS. 3A and 3D).

Accordingly, at block 410, the generating component 240 may further generate the third image 322 of one of the regions depicted in the first image 304, for example by cropping an area of the first image 304 corresponding to the identified region of interest 320, so that the third image 322 has the same resolution as the first image 304. Some further alternative or additional aspects of generating the third image at block 410 are described below with reference to FIG. 6.

At block 412, the method 400 includes determining, by a second object counting model, an updated first portion of the initial object count in the third image. For example, in an aspect, computing device 200, one or more processor 205 individually or in combination, one or more memories 210 individually or in combination, object counting component 215, and/or determining component 245 may be configured to or may comprise means for determining, by a second object counting model, an updated first portion of the initial object count in the third image. In an aspect, the second object count estimator and the first object count estimator may use the same methods. For example, both may be a YOLO-based neural network or a regression based count estimator or an ensemble of both. This keeps the entire system simple as there are not multiple models that need to be trained or configured.

In an aspect, for example, the determining component 245 may perform the task of density estimation for the third image 322. In an aspect, the determining component 245 may provide outputs, such as the second density map 324 (FIGS. 3A and 3E), that may be used to determine an updated count of detected objects 326 for the identified region of interest 320.

At block 414, the method 400 includes compiling an updated object count for the first image based on the updated first portion of the initial object count in the third image. For example, in an aspect, computing device 200, one or more processor 205 individually or in combination, one or more memories 210 individually or in combination, object counting component 215, and/or compiling component 250 may be configured to or may comprise means for compiling an updated object count for the first image based on the updated first portion of the initial object count in the third image.

Some further alternative or additional aspects of the compiling step at block 414 are described in greater detail below in conjunction with FIG. 7.

At block 416, the method 400 includes transmitting a notification based on the updated object count. For example, in an aspect, computing device 200, one or more processor 205 individually or in combination, one or more memories 210 individually or in combination, object counting component 215, and/or transmitting component 255 may be configured to or may comprise means for transmitting a notification based on the updated object count.

For example, if the method for counting objects is used in a surveillance system, the transmitted notification may indicate the count of people in the crowd. Such information may be communicated to a control operator who may take specific control actions, in response to receiving the notification.

Figure 5:
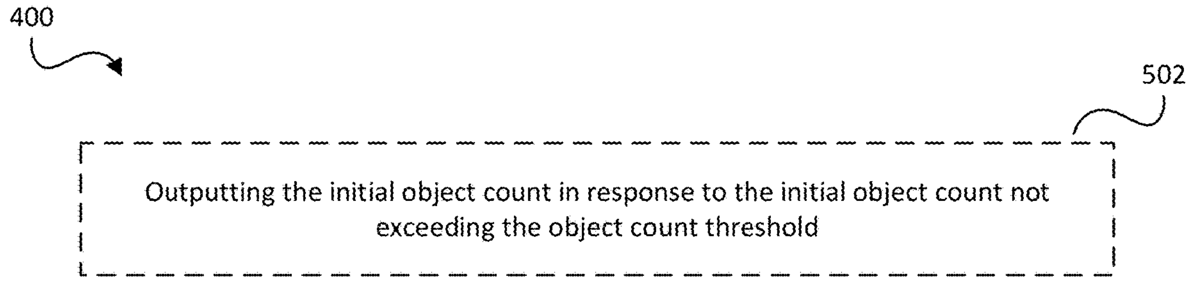
FIG. 5 is a flowchart of additional aspects of the method of FIG. 4 for outputting an object count, in accordance with aspects of the present disclosure.

Referring to FIG. 5, in an alternative or additional aspect, at block 502, the method 400 may further include outputting the initial object count in response to the initial object count not exceeding the object count threshold. For example, in an aspect, computing device 200, one or more processor 205 individually or in combination, one or more memories 210 individually or in combination, object counting component 215, and/or outputting component 260 may be configured to or may comprise means for outputting the initial object count in response to the initial object count not exceeding the object count threshold.

For example, if at block 408 of method 400 it is determined that the initial object count does not exceed the object count threshold, the outputting component 260 may be configured to output the initial object count to one or more output devices using one or more output interfaces. Examples of output devices may include, but are not limited to, a monitor or display screen, a speaker, a printer, and the like. Examples of output interfaces may include, but are not limited to a video adapter, an audio adapter, a port, and the like.

Figure 6:
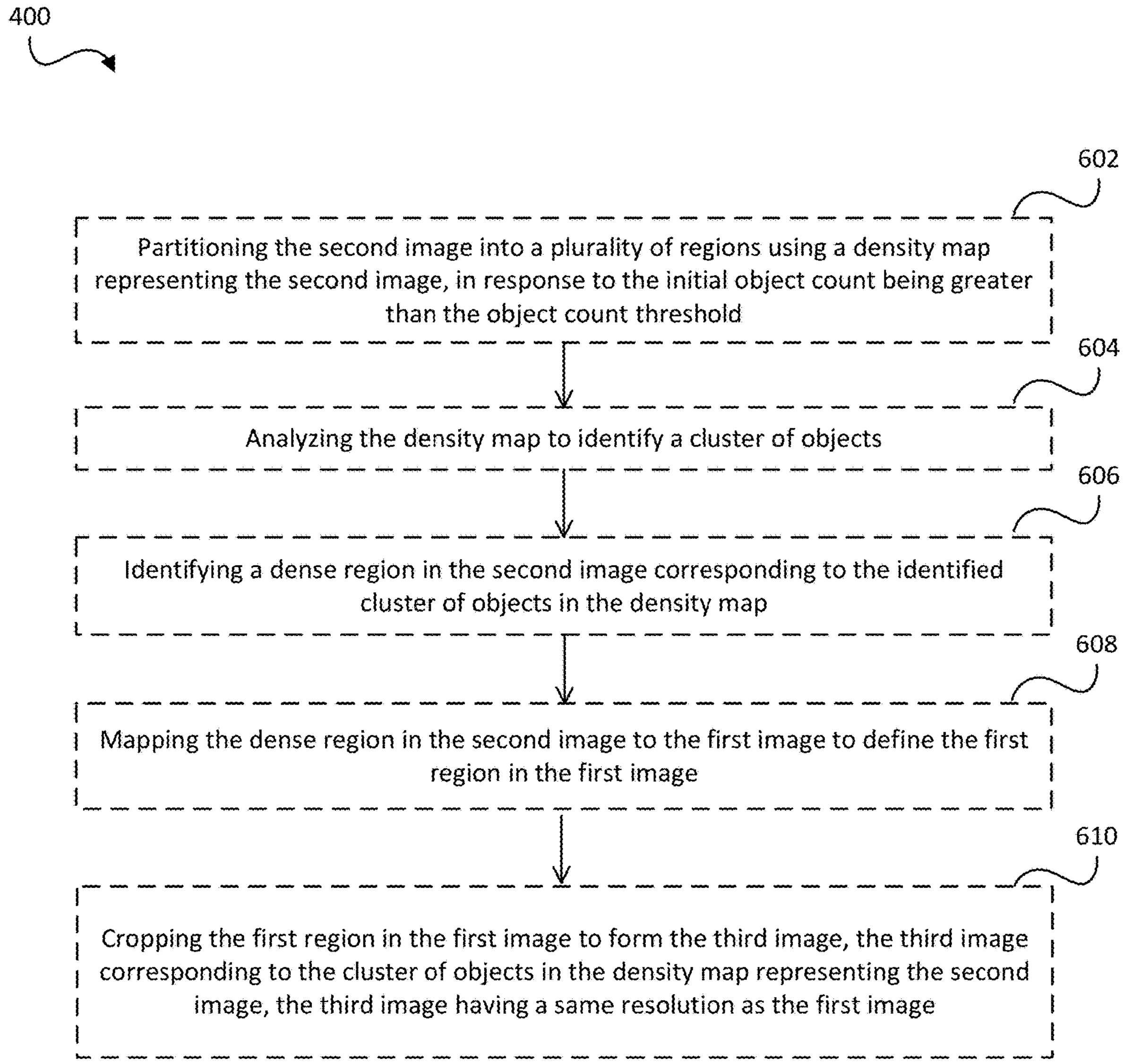
FIG. 6 is a flowchart of additional aspects of the method of FIG. 4 for further processing a dense portion of an image, in accordance with aspects of the present disclosure.

Referring to FIG. 6, in an alternative or additional aspect for generating the third image at block 410 of the method 400, at block 602, the method 400 may further include partitioning the second image into a plurality of regions using a density map representing the second image, in response to the initial object count being greater than the object count threshold. For example, in an aspect, computing device 200, one or more processor 205 individually or in combination, one or more memories 210 individually or in combination, object counting component 215, and/or partitioning component 265 may be configured to or may comprise means for partitioning the second image into a plurality of regions based on a density map, in response to the initial object count being greater than the object count threshold.

For example, the partitioning at block 602 may include dividing each array of pixel values into sub-arrays (also referred to interchangeably as regions or patches) of pixel values. Each sub-array, or region, of pixel values corresponds to a region of the corresponding image. For example, a sub-array of pixel values may include the pixel values used to render a particular cluster of objects (people) in an image of a crowd.

In this optional aspect, at block 604, the method 400 may further include analyzing the density map to identify a cluster of objects. For example, in an aspect, computing device 200, one or more processor 205 individually or in combination, one or more memories 210 individually or in combination, object counting component 215, and/or identifying component 270 may be configured to or may comprise means for analyzing the density map to identify a cluster of objects.

For example, the computing device 200 may analyze the density map 312 to identify a cluster of objects. In an aspect, the count of objects in each cluster may exceed the predetermined object cluster threshold.

In this optional aspect, at block 606, the method 400 may further include identifying a dense region in the second image corresponding to the cluster of objects in the density map. For example, in an aspect, computing device 200, one or more processor 205 individually or in combination, one or more memories 210 individually or in combination, object counting component 215, and/or selecting component 275 may be configured to or may comprise means for identifying a dense region in the second image corresponding to the cluster of objects in the density map.

For example, the computing device 200 may identify the region of interest 320 (FIGS. 3A and 3C) based on a comparison of object counts for the plurality of regions.

In this optional aspect, at block 608, the method 400 may further include mapping the dense region in the second image to the first image to define the first region in the first image. For example, in an aspect, computing device 200, one or more processor 205 individually or in combination, one or more memories 210 individually or in combination, object counting component 215, and/or mapping component 280 may be configured to or may comprise means for mapping the dense region in the second image to the first image to define the first region in the first image.

For example, the computing device 200 may map the region of interest 320 of the second image 308 to the first image 304 to define the first region 305 in the first image 304 (FIGS. 3A and 3B). This mapping may involve generating a bounding box in the first image 304 that is proportional in size and location to the region of interest 320 in the second image 308.

In this optional aspect, at block 610, the method 400 may further include cropping the first region in the first image to form the third image, the third image corresponding to the cluster of objects in the density map representing the second image, the third image having a same resolution as the first image. For example, in an aspect, computing device 200, one or more processor 205 individually or in combination, one or more memories 210 individually or in combination, object counting component 215, and/or cropping component 285 may be configured to or may comprise means for cropping the first region in the first image to form the third image, the third image corresponding to the cluster of objects in the density map representing the second image, the third image having a same resolution as the first image.

For example, the computing device 200 may crop the first region 305 in the first image 304 to form the third image 322. In other words, subsequent to determining a mapping, the object detection and object count estimation component may crop the mapped bounding box to generate the third image 322. For example, but not limited hereto, the third image 322 may be an image capturing the contents of the bounding box of the first region 305 in the resolution of first image 304 and having the resolution of the first image 304.

Figure 7:
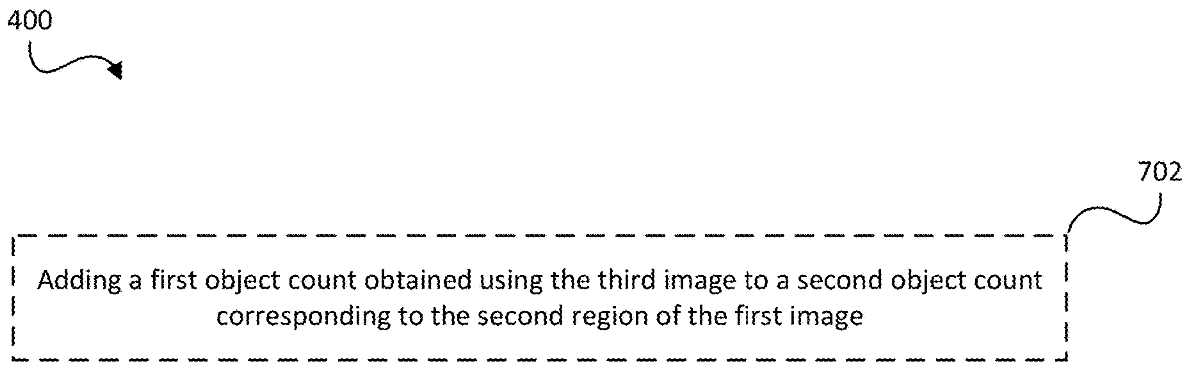
FIG. 7 is a flowchart of additional aspects of the method of FIG. 4 for updating an object count, in accordance with aspects of the present disclosure.

Referring to FIG. 7, in an alternative or additional aspect, at block 702 of the method 400, the compiling at block 414 of the updated object count may further include adding a first object count obtained using the third image to a second object count corresponding to the second region of the first image. For example, in an aspect, computing device 200, one or more processor 205 individually or in combination, one or more memories 210 individually or in combination, object counting component 215, and/or adding component 290 may be configured to or may comprise means for adding a first object count obtained using the third image to a second object count corresponding to the second region of the first image.

For example, the computing device 200 may add the object count in the third image 322 to the object count corresponding to of the remainder of the first image 304.

In an alternative or additional aspect, the first object counting model and the second object counting model are a same object counting model.

For example, the present aspects may be implemented according to one or more of the following clauses.

1. A method for counting objects in an image, comprising:
   - receiving a first image having a first size greater than a size threshold;
   - formatting the first image into a second image having a second size less than the first size;
   - estimating, using a first object counting model, an initial object count in the second image;
   - comparing the initial object count with an object count threshold; generating a third image using a first region of the first image in response to the initial object count being greater than the object count threshold, wherein the first region corresponds to a first portion of the initial object count greater than a second portion of the initial object count corresponding to a second region of the first image;
   - determining, by a second object counting model, an updated first portion of the initial object count in the third image; compiling an updated object count for the first image based on the updated first portion of the initial object count in the third image; and
   - transmitting a notification based on the updated object count.

2. The method of clause 1, further comprising outputting the initial object count in response to the initial object count not exceeding the object count threshold.

3. The method of any one of the preceding clauses, wherein generating the third image further comprises:

partitioning the second image into a plurality of regions using a density map representing the second image, in response to the initial object count being greater than the object count threshold;

analyzing the density map to identify a cluster of objects; and identifying a dense region in the second image corresponding to the cluster of objects in the density map.

4. The method of clause 3, wherein generating the third image further comprises:

mapping the dense region in the second image to the first image to define the first region in the first image; and cropping the first region in the first image to form the third image, the third image corresponding to the cluster of objects in the density map representing the second image, the third image having a same resolution as the first image.

5. The method of any one of the preceding clauses, wherein compiling the updated object count further comprises adding a first object count obtained using the third image to a second object count corresponding to the second region of the first image.

6. The method of any one of the preceding clauses, wherein the first object counting model and the second object counting model are a same object counting model.

7. An apparatus for counting objects in an image, comprising:

one or more memories storing instructions; and one or more processors communicatively coupled with the one or more memories and, individually or in combination, configured to execute the instructions to:

receive a first image having a first size greater than a size threshold;

format the first image into a second image having a second size less than the first size;

estimate, using a first object counting model, an initial object count in the second image;

compare the initial object count with an object count threshold;

generate a third image using a first region of the first image in response to the initial object count being greater than the object count threshold, wherein the first region corresponds to a first portion of the initial object count greater than a second portion of the initial object count corresponding to a second region of the first image;

determine, by a second object counting model, an updated first portion of the initial object count in the third image;

compile an updated object count for the first image based on the updated first portion of the initial object count in the third image; and transmit a notification based on the updated object count.

8. The apparatus of clause 7, wherein the one or more processors, individually or in combination, are further configured to execute the instructions to perform the method of any one of clauses 2 to 6.

9. One or more non-transitory computer-readable media having instructions stored thereon for counting objects in an image, wherein the instructions are executable by one or more processors, individually or in combination, to:

receive a first image having a first size greater than a size threshold;

format the first image into a second image having a second size less than the first size;

estimate, using a first object counting model, an initial object count in the second image;

compare the initial object count with an object count threshold;

generate a third image using a first region of the first image in response to the initial object count being greater than the object count threshold, wherein the first region corresponds to a first portion of the initial object count greater than a second portion of the initial object count corresponding to a second region of the first image;

determine, by a second object counting model, an updated first portion of the initial object count in the third image;

compile an updated object count for the first image based on the updated first portion of the initial object count in the third image; and transmit a notification based on the updated object count.

10. The one or more non-transitory computer-readable media of claim 13, wherein the instructions are further executable to perform the method of any one of clauses 2 to 6.

11. An apparatus for counting objects in an image, comprising means for:

receiving a first image having a first size greater than a size threshold;

formatting the first image into a second image having a second size less than the first size;

estimating, using a first object counting model, an initial object count in the second image;

comparing the initial object count with an object count threshold;

generating a third image using a first region of the first image in response to the initial object count being greater than the object count threshold, wherein the first region corresponds to a first portion of the initial object count greater than a second portion of the initial object count corresponding to a second region of the first image;

determining, by a second object counting model, an updated first portion of the initial object count in the third image;

compiling an updated object count for the first image based on the updated first portion of the initial object count in the third image; and transmitting a notification based on the updated object count.

12. The apparatus of clause 11, further comprising means for performing the method of any one of clauses 2 to 6.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for counting objects in an image, comprising:

receiving a first image having a first size greater than a size threshold;

resizing the first image into a second image having a second size less than the first size, the second image having a lower resolution than the first image;

estimating, using a first object counting model, an initial object count in the second image, comprising generating a first density map based on the second image and determining the initial object count based on the first density map;

comparing the initial object count with an object count threshold;

generating a third image using a first region of the first image in response to the initial object count being greater than the object count threshold, wherein the first region has a first portion of the initial object count greater than a second portion of the initial object count corresponding to a second region of the first image;

determining, by a second object counting model, an updated first portion of the initial object count in the third image, the third image having a same resolution as the first image;

compiling an updated object count for the first image based on the updated first portion of the initial object count in the third image; and transmitting a notification based on the updated object count.

2. The method of claim 1, further comprising outputting the initial object count in response to the initial object count not exceeding the object count threshold.

3. The method of claim 1, wherein generating the third image further comprises:

partitioning the second image into a plurality of regions using a density map representing the second image, in response to the initial object count being greater than the object count threshold;

analyzing the density map to identify a cluster of objects; and identifying a dense region in the second image corresponding to the cluster of objects in the density map.

4. The method of claim 3, wherein generating the third image further comprises:

mapping the dense region in the second image to the first image to define the first region in the first image; and cropping the first region in the first image to form the third image, the third image corresponding to the cluster of objects in the density map representing the second image, the third image having a same resolution as the first image.

5. The method of claim 1, wherein compiling the updated object count further comprises adding a first object count obtained using the third image to a second object count corresponding to the second region of the first image.

6. The method of claim 1, wherein the first object counting model and the second object counting model are a same object counting model.

7. An apparatus for counting objects in an image, comprising:

one or more memories storing instructions; and one or more processors communicatively coupled with the one or more memories and, individually or in combination, configured to execute the instructions to:

receive a first image having a first size greater than a size threshold;

resize the first image into a second image having a second size less than the first size, the second image having a lower resolution than the first image;

estimate, using a first object counting model, an initial object count in the second image, comprising generating a first density map based on the second image and determining the initial object count based on the first density map;

compare the initial object count with an object count threshold;

generate a third image using a first region of the first image in response to the initial object count being greater than the object count threshold, wherein the first region has a first portion of the initial object count greater than a second portion of the initial object count corresponding to a second region of the first image;

determine, by a second object counting model, an updated first portion of the initial object count in the third image, the third image having a same resolution as the first image;

compile an updated object count for the first image based on the updated first portion of the initial object count in the third image; and transmit a notification based on the updated object count.

8. The apparatus of claim 7, wherein the one or more processors, individually or in combination, are further configured to execute the instructions to output the initial object count in response to the initial object count not exceeding the object count threshold.

9. The apparatus of claim 7, wherein to generate the third image, the one or more processors, individually or in combination, are further configured to execute the instructions to:

partition the second image into a plurality of regions using a density map representing the second image, in response to the initial object count being greater than the object count threshold;

analyze the density map to identify a cluster of objects; and identify a dense region in the second image corresponding to the cluster of objects in the density map.

10. The apparatus of claim 9, wherein to generate the third image, the one or more processors, individually or in combination, are further configured to execute the instructions to:

map the dense region in the second image to the first image to define the first region in the first image; and crop the first region in the first image to form the third image, the third image corresponding to the cluster of objects in the density map representing the second image, the third image having a same resolution as the first image.

11. The apparatus of claim 7, wherein to compile the updated object count, the one or more processors, individually or in combination, are further configured to execute the instructions to add a first object count obtained using the third image to a second object count corresponding to the second region of the first image.

12. The apparatus of claim 7, wherein the first object counting model and the second object counting model are a same object counting model.

13. One or more non-transitory computer-readable media having instructions stored thereon for counting objects in an image, wherein the instructions are executable by one or more processors, individually or in combination, to:

receive a first image having a first size greater than a size threshold;

resize the first image into a second image having a second size less than the first size, the second image having a lower resolution than the first image;

estimate, using a first object counting model, an initial object count in the second image, comprising generating a first density map based on the second image and determining the initial object count based on the first density map;

compare the initial object count with an object count threshold;

generate a third image using a first region of the first image in response to the initial object count being greater than the object count threshold, wherein the first region has a first portion of the initial object count greater than a second portion of the initial object count corresponding to a second region of the first image;

determine, by a second object counting model, an updated first portion of the initial object count in the third image, the third image having a same resolution as the first image;

compile an updated object count for the first image based on the updated first portion of the initial object count in the third image; and transmit a notification based on the updated object count.

14. The one or more non-transitory computer-readable media of claim 13, wherein the instructions are further executable to output the initial object count in response to the initial object count not exceeding the object count threshold.

15. The one or more non-transitory computer-readable media of claim 13, wherein to generate the third image, the instructions are further executable to:

partition the second image into a plurality of regions using a density map representing the second image, in response to the initial object count being greater than the object count threshold;

analyze the density map to identify a cluster of objects; and identify a dense region in the second image corresponding to the cluster of objects in the density map.

16. The one or more non-transitory computer-readable media of claim 15, wherein to generate the third image, the instructions are further executable to:

map the dense region in the second image to the first image to define the first region in the first image; and crop the first region in the first image to form the third image, the third image corresponding to the cluster of objects in the density map representing the second image, the third image having a same resolution as the first image.

17. The one or more non-transitory computer-readable media of claim 13, wherein to compile the updated object count, the instructions are further executable to add a first object count obtained using the third image to a second object count corresponding to the second region of the first image.

18. The one or more non-transitory computer-readable media of claim 13, wherein the first object counting model and the second object counting model are a same object counting model.

* * * * *